REGENERATIVE REPEATER AND PHASE REGENERATING CIRCUIT

Filed Dec. 13, 1966 4 Sheets-Sheet 1

INVENTOR

MASAYASU HATA

BY MacGlew and Toren

ATTORNEYS

INVENTOR
MASAYASU HATA
BY McGlew and Toren
ATTORNEYS

March 24, 1970 MASAYASU HATA 3,502,985

REGENERATIVE REPEATER AND PHASE REGENERATING CIRCUIT

Filed Dec. 13, 1966 4 Sheets-Sheet 3

INVENTOR

MASAYASU HATA

BY McGlew and Toren

ATTORNEYS

March 24, 1970 MASAYASU HATA 3,502,985

REGENERATIVE REPEATER AND PHASE REGENERATING CIRCUIT

Filed Dec. 13, 1966 4 Sheets-Sheet 4

United States Patent Office 3,502,985 Patented Mar. 24, 1970

3,502,985

REGENERATIVE REPEATER AND PHASE REGENERATING CIRCUIT

Masayasu Hata, Tokyo, Japan, assignor to Oki Electric Industry Company Limited, Tokyo, Japan Filed Dec. 13, 1966, Ser. No. 622,006
Claims priority, application Japan, Dec. 15, 1965, 40/76,650; Jan. 10, 1966, 41/923
Int. Cl. H04b *7/14*
U.S. Cl. 325—13 7 Claims

ABSTRACT OF THE DISCLOSURE

A regenerative repeater, in a system for transmitting codes by phase modulation of plural phases, uses a sampling technique and a slicing technique in the intermediate frequency band. A basic phase signal is derived from the intermediate frequency and is converted into pulses which are superposed on the phase modulated signals and applied to a circuit having a threshold value characteristic. The output of this circuit is filtered to regenerate the phase modulated signal. The regeneration of a phase, in the regenerative repetition of a phase-modulated signal, is formed in a simple manner by a negative resistance element and a resistance and this arrangement can be used for a direct regenerative repeater system.

This invention relates to regenerating circuits and more particularly to a new regenerative repeater carrying out a direct regenerating function in an intermediate frequency band or in a carrier frequency band, and to a phase regenerating circuit to be used in said repeater.

Generally, it is a known fact that, in the transmission of P.C.M. multiple telephone signals by a wire, wireless or coaxial carrier system, or in the transmission of coded signals of data and information, if a noise to signal ratio (NS ratio of about 17 to 20 decibels is obtained by carrying out a regenerative repetition, the reduction of the quality of the information, by the increase of noises and distortions, will be kept very small and an information transmission of a high quality will become possible.

There have been suggested various techniques on how to regeneratively repeat information of a high quality on the basis of such known fact.

According to one of such techniques, in a 24-channel P.C.M. apparatus for the multiplication of interstation repeating lines by voice cables, as pulses of video tapes are used, the direct wave form detection and the recovery of the timing function is made in the regenerative repetition. However, in transmitting many channels in the P.C.M. system, the carrier wave must be transmitted by demodulating the modulated wave. This requires that the code must be regenerated after the P.C.M. signal is detected at the time of the regenerative repetition, and then the carrier must be modulated and transmitted. As a result, such a technique has the disadvantage that the regeneration process is very complicated and a satisfactory regenerative characteristic cannot always be obtained.

In the transmission of P.C.M. codes in microwave communication it has been attempted to obtain information of a high quality by the direct regenerative repetition in the intermediate frequency band, by utilizing a tunnel diode parametron oscillator. But its merits and demerits are not yet sufficiently established clear enough. Generally, there is devised a so-called wave detecting regenerative repeater wherein the wave of a phase modulated signal in the intermediate frequency band is detected, is converted to a code of the base band, has the wave form shaped and regenerated, has the phase modulated and is repeated. However, in this kind of repeater, too there are disadvantages that the circuit formation is complicated and that the regenerative characteristic is deteriorated.

The first object of the present invention is to provide a regenerative repeater in a system for transmitting codes of P.C.M. or the like by the phase modulation of two, four or more phases, wherein a sampling technique and a slicing technique are used in the carrier frequency band (or in the intermediate frequency band in the microwave transmission) so that the construction of the repeater for use in a communication system is very simple.

The second object of the present invention is to provide a regenerative repeater wherein a basic phase signal is detected from a phase modulated signal in an intermediate frequency band, said the basic phase signal is converted to a pulse, the pulse is superposed on the phase modulated signal and is applied to a circuit having a threshold value characteristic, and the output of the circuit having the threshold value characteristic is filtered to regenerate the phase-modulated signal so that the regenerative repeater is simplified and the phase regenerating characteristic is improved.

The third object of the present invention is to provide a phase, regenerating circuit wherein the regeneration of a phase in the regenerative repetition of a phase-modulated signal, is formed in a simple manner by a negative resistance element and a resistance, and which can be used for a direct regenerative repeater system.

Figure 1:
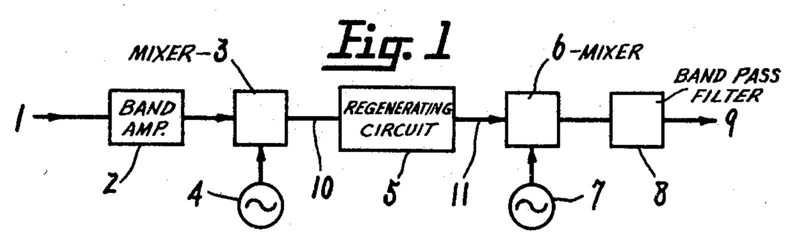
FIG. 1 is a block diagram of a known regenerative repeater system.

In order to facilitate an understanding of the present invention, the regenerative repeater, used in microwave communication, as shown in FIG. 1 will first be explained. An input signal 1 is applied to a band amplifier 2, and the output of band amplifier 2 is applied to a mixer 3 where the frequency of the input signal 1 is converted to any desired intermediate frequency by a local signal source 4, such as an oscillator. The regenerating circuit is indicated at 5, and the output of circuit 5 is applied to a mixing circuit 6 for effecting frequency conversion. There is also supplied to mixing circuit 6 the output of a signal source 7, of any frequency, having the necessary electric power. The desired signal wave is derived by a band pass wave filter 8, and is transmitted as a regenerated signal 9. In the case of wire communication, the regenerative repeater may include only the regenerating circuit 5, which has the intermediate frequency input signal applied thereto over the line 10. This line 10 will be hereinafter referred to as the regenerated signal line.

Figure 2:
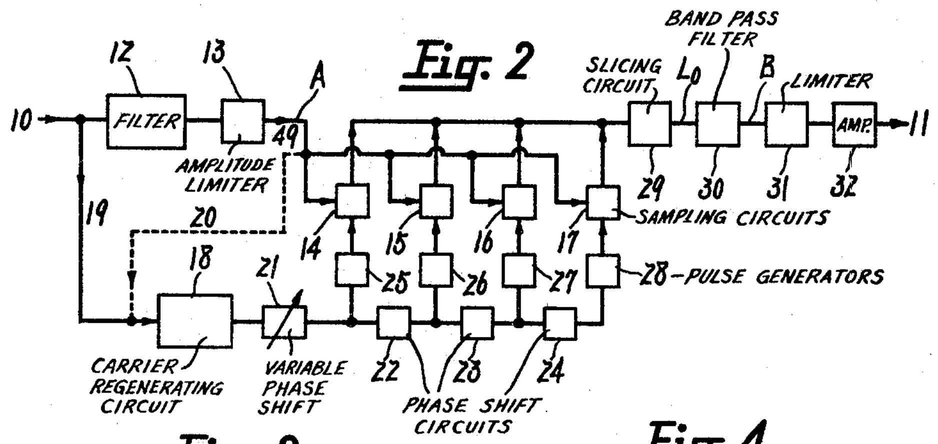
FIG. 2 is a block diagram of a regenerative repeater of the present invention.

Referring to FIG. 2, the output of mixer 3 is applied through line 10 to a wave filter 12, in which the desired signal is separated and the distortion is equalized and compensated. The output of wave filter 12 is applied to an amplitude limiter 13, in which any unnecessary amplitude fluctuation is removed so that the subsequent circuit operation is maintained stable. The output of amplitude limiter or limiting circuit 13 is applied, in parallel, to sampling circuits 14, 15, 16 and 17.

Through a conductor or line 19, the regenerated signal from line 10 is applied to a carrier wave regenerating circuit 18 which regenerates a phase signal or carrier necessary for regenerative repetition. However, it should be noted that, through the line 20 shown in broken lines, the necessary carrier wave can be regenerated from the output signal of the amplitude limiting circuit 13. Generally, in a phase-reversing modulation (two-phase) or a vertically intersecting four-phase phase-modulation, no carrier wave component is contained in the transmitted signal. However, it is well known that a carrier wave to form the base of the phase can be regenerated by a method such as described, for example, by W. Hannan and T. Olson in the RCA Review, December 1961.

A variable phase-shifting circuit 21 is connected to the output of carrier wave regenerating circuit 18 so that a fixed amount of the phase shift, received in circuits 12, 13 and 18, may be compensated and a basic signal of a correct phase obtained. The carrier wave from phase-shifting circuit 21, having a correct basic phase, is transformed into four basic phase signals, differing by 90 degrees from each other, by three phase-shifting circuits 22, 23 and 24. Circuit 22 has a lag of 90 degrees relative to circuit 21, circuit 23 has a lag of 90 degrees relative to circuit 22, and circuit 24 has a lag of 90 degrees relative to circuit 23. The four basic phase signals drive four sampling pulse generating circuits 25, 26, 27 and 28 respectively.

Figure 3:
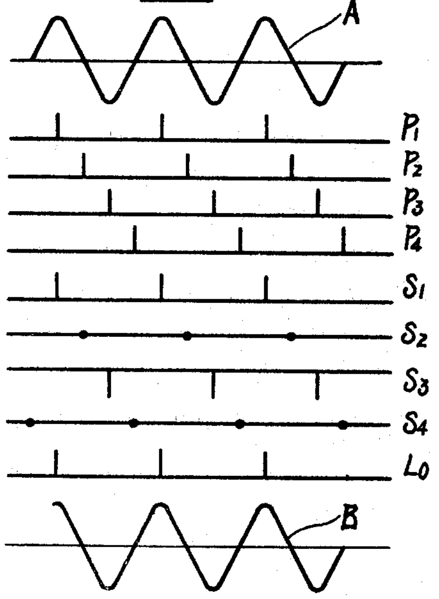
FIG. 3 is a wave form relation diagram for explaining the operation of the regenerative repeater in FIG. 2.

Referring to FIG. 3 which diagrammatically illustrates the operation of the regenerating circuit, $P_1$, $P_2$, $P_3$ and $P_4$ are groups of narrow pulses formed in the respective sampling pulse generating circuits 25, 26, 27 and 28. A wave form A is one of the output signals of the amplitude limiting circuit 13 at a certain time and represents the case of correct phase relation. That is to say, the phase relations shown in the diagram are maintained for the sampling pulse groups $P_1$, $P_2$, $P_3$ and $P_4$. The outputs of the sampling circuits 14, 15, 16 and 17, in this case, are represented by $S_1$, $S_2$, $S_3$ and $S_4$ in FIG. 3, respectively. The thus sampled outputs are then sliced on a fixed slicing level by a slicing circuit 29 in FIG. 2, and only the outputs reaching the fixed level are taken out on the output side. $L_0$ in FIG. 3 represents such output pulse group. 30 in FIG. 2 is a band wave filter having the required band characteristics. By passing the pulse group $L_0$ of the slicing circuit outputs through this filter, the regenerated signal represented by B in FIG. 3 will be obtained. 31 is an amplitude limiter for removing amplitude variations due made by such causes as are explained later. 32 is an amplifier. The thus regenerated signal 11 is transmitted as explained in FIG. 1.

Figure 4:
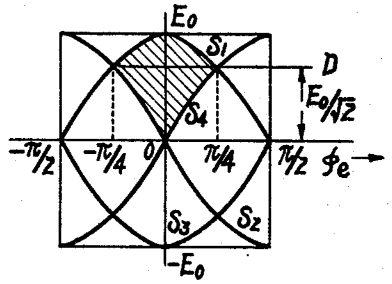
FIG. 4 is a diagram for explaining the regenerating operation of the regenerative repeater in case the phase of the regenerated signal is deviated.

The above explanation refers to the case wherein the phase of the regenerated signal 10 has a correct value. However, it is usual that, due to noises and other causes, the phase of the regenerated signal 10 has deviated with respect to the basic carrier wave phase. The regenerating operation of the regenerating circuit in such case is shown in FIG. 4. The abscissa represents the phase deviations $\phi e$ from the basic phase, and the ordinate represents the respective outputs $S_1$, $S_2$, $S_3$ and $S_4$ of the sampling circuits 14, 15, 16 and 17. Therefore, the condition for generating regenerated signals of a correct phase is that the phase deviation $\phi e$ satisfies the relations of $S_1>S_2$, $S_1>S_3$ and $S_1>S_4$. This range is represented by the hatched part in FIG. 4. Therefore, the slicing level providing the maximum allowable phase deviation is a level of $E_0/\sqrt{2}$, represented by D in FIG. 4, for a phase-modulated wave of four phases. The allowable phase deviation for a correct phase regeneration corresponding to the slicing level D will be within the range defined by the phase deviation of $$\pm\pi/4$$

Figure 5:
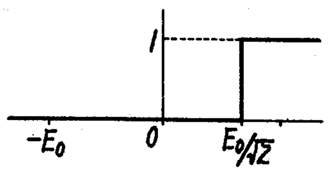
FIG. 5 is a slicing characteristic diagram of a slicing circuit used in the regenerative repeater.
Figures 6, 7, 9, 10:
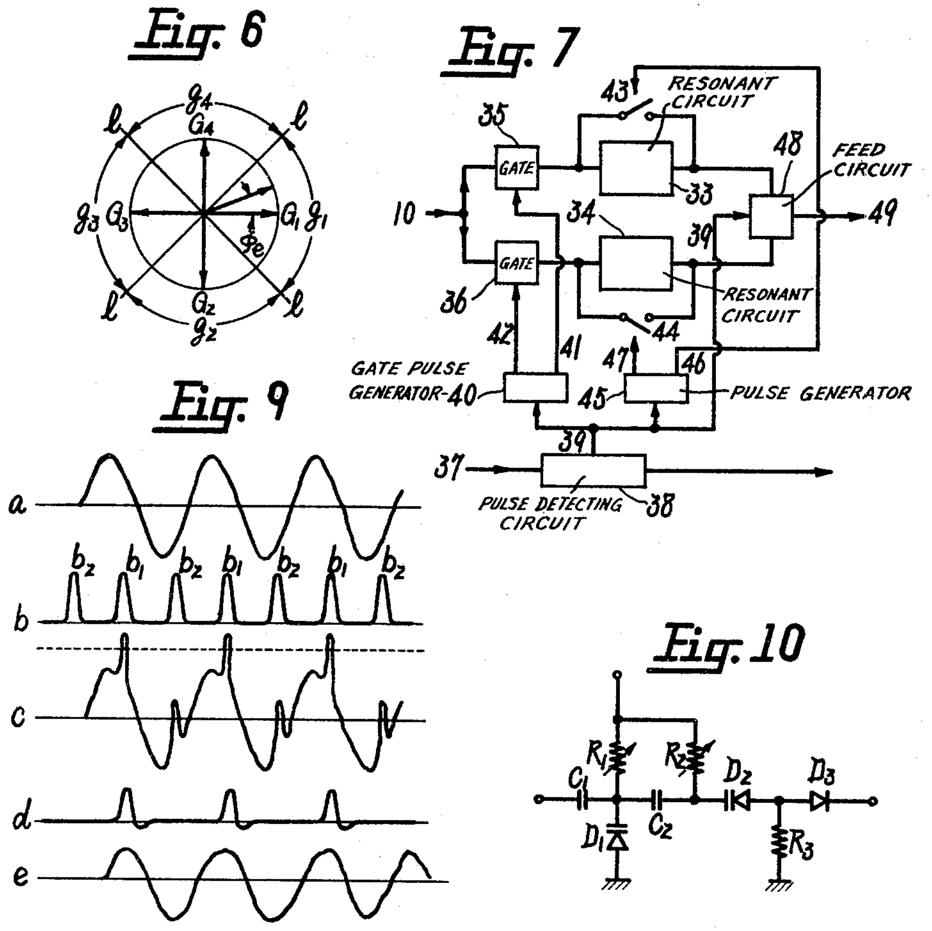
FIG. 6 is a diagram showing, with signal spaces the regenerating operation of the regenerating circuit.
FIG. 7 is a diagram of an embodiment of a wave filter matched with signals to be used in the regenerating circuit.
FIG. 9 is a wave form relation diagram of the respective parts in FIG. 8.
FIG. 10 is a circuit diagram of a pulse generating circuit used in this embodiment.

FIG. 5 shows an example of characteristics of the slicing circuit used in the present invention, the abscissa representing the inputs and the ordinate representing the outputs. Further, the ordinate is normalized. FIG. 6 represents, with signal intervals, the regenerating operation shown in FIG. 4. $G_1$, $G_2$, $G_3$ and $G_4$ therein represent signal vectors in the case where there is no phase deviation. If the phase deviation $\phi e$ of the signal vector $G_1$ is in the range represented by $g_1$, the signal will be regenerated as a signal having a correct phase.

In the same manner, the regenerated signal vectors in the ranges of $g_2$, $g_3$ and $g_4$ will be regenerated as signal vectors $G_2$, $G_3$ and $G_4$ respectively. In the regenerated signal vector to be $G_1$ enters the range $g_4$, the regenerated signal will be no longer regenerated as a signal in the correct phase, but a signal in the phase for $G_4$ will be sent out. This corresponds to the fact that a code error has been produced. That is to say, the boundary line represented by $l$ is called a decision threshold. The decision mechanism shown in such range can be said to be an optimum decision mechanism in case the respective signal vectors are transmitted at equal probabilities.

Thus it is found that the decision mechanism of the signal of the present invention is that of an optimum system. The slicing circuit used in the above mentioned embodiment can be replaced with an amplitude comparing circuit, such as a Schmitt circuit or a blocking oscillator. That is to say, an amplitude comparing circuit in which, the moment the amplitudes of two wave forms, for example, one being the output of a sampling circuit and the other being a reference voltage corresponding to a slicing level of $E_0\sqrt{2}$, become equal to each other, a pulse will be generated may be used in place of the slicing circuit in the present invention.

It should be understood that the arrangement shown in FIG. 2 is merely exemplary. Thus, for the four sampling circuits 14, 15, 16 and 17 there can be substituted a single sampling circuit, such as the sampling circuit 14, which is common to all of the pulse generating circuits 25, 26, 27 and 28. In such a case, the outputs of the four sampling pulse generating circuits 25, 26, 27 and 28 will be combined into one output and will be added to one sampling circuit. Further, it should be noted that, in such case, it is possible to form the four sets of the sampling pulses $P_1$, $P_2$, $P_3$ and $P_4$ by generating one narrow sampling pulse $P_1$, applying this pulse to three delaying elements each having a respective delay time, so as to delay the sampling pulses, and combining the delayed pulses, instead of using the method in FIG. 2.

In an actual circuit, the sampling pulse has a limited width and the ideal slicing characteristic as shown in FIG. 5 is difficult to obtain. In this case, the regenerated signal will have a residual phase deviation and an amplitude variation. Naturally, it is desirable that the pulse width and the slicing characteristic should be within permissible values. For this purpose, an amplitude limiter 31 is included in the circuit of FIG. 2 to remove amplitude variations produced by the causes just mentioned.

The wave filter 12 has the function of selecting carrier waves of any desired group and reducing noises by limiting the band, particularly in a system wherein many P.C.M. signals are multiplexed for a certain number of channels so as to form many groups, and carrier wave signals, corresponding to the respective groups, are modulated and transmitted. Filter 12 should have not only the above functions but also should be such as to reduce the interference between codes to be as small as possible. For this purpose wave filter 12 usually comprises a combination of two or more filters rather than a single filter.

An example, which is considered to be the most effective of such wave filters, is shown in FIG. 7. This formation is a modification of a circuit disclosed by M. L. Doelz in the IRE, May 1957. 33 and 34 are resonant circuits having a high Q and tuned with the carrier frequency. 35 connected before 33 and 36 connected before 34 are respective gate circuits. A pulse synchronized by a code sent through a timing communication line 37 is detected with a synchronized pulse detecting circuit 38. A gate pulse generator 40 is synchronized by output pulse 39 of circuit 38. Outputs 41 and 42 of generator 40 are of polarities reverse to each other. The regenerated signal 10 will excite the resonators 33 and 34 with outputs 41 and 42 alternately, for each code. Therefore, when the respective resonators are excited alternately for the period of one code, they will continue a self-oscillation for the period of the next one code as a result of the excitation. Simultaneously with the end of this period, an electronic switch 43 or 44 will operate to immediately stop the self-oscillation. These electronic switches 43 and 44 are operated by pulses 46 and 47 generated by a pulse generator 45 responsive to a terminated pulse 39. The resonant circuits 33 and 34 operate exactly in the same manner, except that the time of operation thereof is separated by the period of one code. 48 is a circuit supplying an output signal 49 only for the period during which the resonant circuits 33 and 34 are in a self-oscillating state, and is controlled with the synchronized pulse 39. In the thus obtained output signal 49, any interference from other carrier wave signals is eliminated, and the equivalent band width of noises is limited to the minimum required for the faithful detection of the signal. Such a wave filter is said to be matched with the signal.

As is evident from the above explanation of the present invention, as the phase-modulated signal is regenerated in the carrier frequency band, only the regenerating mechanism may be required, instead of the wave detecting, regenerating and modulating mechanisms in the system wherein the wave is detected, regenerated and repeated. For example, in the case of a microwave communication system of a digital phase-modulated multiroute system, when the regenerating system according to the present invention is used in other routes than the routes branched and inserted in relay stations, the formation of the communication system will be simplified. With the present invention, substantial advantages, both direct and indirect, with respect to the overall economy, the stability and the simplification of maintenance are provided with respect to the communication equipment.

Figure 8:
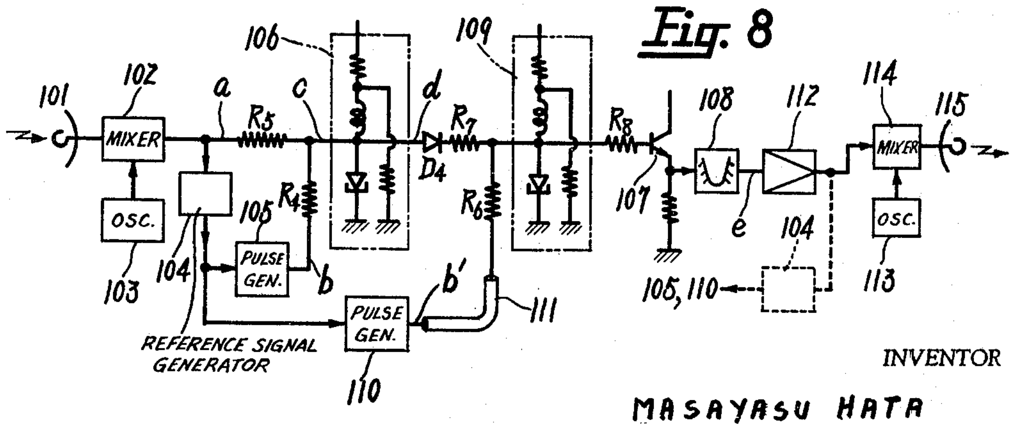
FIG. 8 is a block diagram of another embodiment of a regenerative repeater system, in which is used a regenerative repeater of the present invention.

The second object of the present invention shall now be explained in detail with reference to FIGS. 8 to 12. FIG. 8 is a formation diagram of a regenerative repeater showing an embodiment in the case of a phase reversing modulation, that is, a two-phase phase modulation. FIG. 9 is a wave form diagram of the respective parts.

When a microwave signal received by an antenna 101 is mixed with the output of a local signal source 103 in a mixing circuit 102, a phase-modulated signal, in an intermediate frequency band such as shown at *a* in FIG. 9, that is, an intermediate frequency input in a regenerative repeater, will be obtained. A continuous basic phase signal, having a frequency, twice as high as the intermediate frequency will be regenerated by the basic phase regenerating circuit 104 formed by combining a known full wave rectifying circuit and a narrow band wave filter, further utilizing the automatic phase controlling technique to synchronize the phase of the automatic oscillator so as not to be influenced by noises or the like.

A train of narrow pulses, larger in amplitude than the intermediate frequency input *a*, is formed from this basic phase signal in a pulse generating circuit 105, and shown in *b* in FIG. 9.

Pulse train *b* is formed of alternate pulses $b_1$ and $b_2$ representing the basic phases 0 and $\pi$, respectively. As a pulse generating circuit for generating such pulse train *b*, there can be used a known very high speed pulse generating circuit, such as shown in U.S. Patent #3,168,654. In such a circuit, as shown in FIG. 10, pulses are shaped by cutting the front edge and rear edge of the positive polarity part of the basic phase wave signal, as determined by a bias current, by using step recovery diodes $D_1$ and $D_2$. In the case where the code transmitting speed is 77 megabits/sec., the intermediate frequency is about 30 mc./sec., and therefore the frequency of the basic phase wave signal is about 60 mc./sec., there is obtained a pulse train *b* in which the pulse rise is 0.6 to 1 ns., the pulse width is 1.5 to 2 ns. and the pulse amplitude is about 0.4 vpp.

$D_3$ is an ordinary high conduction diode. $R_1$, $R_2$ and $R_3$ are resistances. $C_1$ and $C_2$ are condensers.

Pulse train *b* is passed through a coupling resistance $R_4$, is superposed on an intermediate frequency input *a* passed through another coupling resistance $R_5$ and is added, as pulse train *c* to a monostable multivibrator 106.

As monostable multivibrator 106 is biased to substantially the amplitude of the pulses *b*, the superposition of these pulses on the intermediate frequency input *a* to form the pulses *c*, will result in exceeding of the threshold value of multivibrator 106 and thus will drive this multivibrator.

Therefore, even if the intermediate frequency input *a* has been subjected to phase deviation by noises or the distortion of the transmission characteristics, the output pulse of the monostable multivibrator 106 will be generated at a time corresponding to the pulse train $b_1$ or $b_2$ maintaining the basic phase. The output pulse train of monostable multivibrator 106 corresponds to the phase 0 or $\pi$, for example, of the P.C.M. code as shown at *d* in FIG. 9. Therefore, output pulse train *d* can be taken out with an emitter follower 107, and the phase modulated signal in the intermediate frequency band, that is the intermediate frequency output as shown at *e* in FIG. 9, can be regenerated with a wave filter 108 having a proper impulse response or, for example, an impulse response corresponding to the cosine wave form of 1 cycle in the intermediate frequency.

Figure 11:
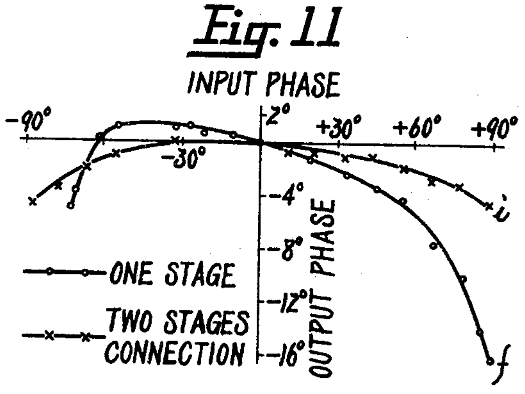
FIG. 11 is a phase regenerating characteristic diagram of the regenerative repeater of this embodiment.
Figure 12:
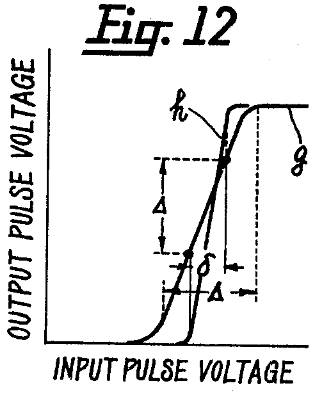
FIG. 12 is a threshold value characteristic diagram of a monostable multivibrator used in this embodiment.

However, as the time of the generation of the output pulses *d* of the monostable multivibrator 106 is influenced by the input pulse voltage of the monostable multivibrator, if the phase of the intermediate frequency input *a* is deviated near to $\pm 90$ degrees, as shown at *f* in FIG. 11, the phase of the intermediate frequency output *e* also will be considerably deviated. Further, as shown in FIG. 12, when the input pulse voltage of the monostable multivibrator 106 is plotted on the abscissa and the output pulse voltage plotted on the ordinate, if the threshold value characteristic *g* of the monostable multivibrator 106 is not ideal and it has a may-be phase region $\Delta$ and the phase of the intermediate frequency input *a* is deviated near to $\pm 90$ degrees, the input pulsle voltage of the monostable multivibrator 106 will be present in the may-be phase region $\Delta$. Monostable multivibrator 106 can not be effectively driven and therefore the phase of the intermediate frequency output *e* will also become indefinite in accordance with the size of the may-be region.

Therefore, in this invention, the pulse train of the pulse generator is superposed on the output pulse *d* of the first stage monostable multivibrator 106 in which the fluctuation has been reduced and, by the second stage monostable multivibrator 109, the regeneration of the phase is improved. Further, due to such two stage tandem connected monostable multivibrators, as shown in FIG. 12, the output of the first stage will become the input of the second stage. Thus, the may-be region $\Delta$, in the threshold value characteristics of the first stage, will be improved to $\delta$ in the second stage and the indefinite range of the phase of the intermediate frequency output will be reduced.

That is to say, a pulse train $b'$ identical with pulse train $b$ is derived from the basic phase wave signal, is passed through a coaxial cable 111, for making the delay time of pulse train $b'$ the same as the delay time of the output pulse train *d* of the monostable multivibrator 106, and a coupling resistance $R_6$, is superposed on said pulse train *d* passed through a coupling diode $D_4$, and a resistance $R_7$ and is added to the second stage monostable multivibrator 109.

In the monostable multivibrator 109, the pulse train $b'$ is superposed on the output alternating pulses *d*. When the pulse train $b_1'$, $b_2'$ of pulse train *b* exceed the threshold value of monostable multivibrator 109, the latter will be driven and will generate an output pulse $d'$ corresponding to the output pulse of the monostable multivibrator 106, as shown at *d* in FIG. 9. When the output phase is determined by tandem connecting two or more stages of monostable multivibrators 106 and 109, the phase regenerating characteristic will be as shown at *i* in FIG. 11, and the phase deviation of the regenerated intermediate frequency output will be improved to be less than about 4 degrees.

Further, FIG. 11 illustrates the case wherein the phase of the intermediate frequency input is zero. Needless to say, in case the phase of the intermediate frequency input is $\pi$, there will be obtained the same characteristic except that the phase of the intermediate frequency output is different by $\pi$.

A phase-modulated signal is regenerated from output pulse $d'$ through a coupling resistance $R_8$, emitter follower 107 and wave filter 108, is amplified in an amplifier 112, has the frequency converted with the output of a microwave source 113 in a mixing circuit (or a transmitted frequency converting circuit) 114 and is transmitted through an antenna 115.

Further, as shown by the broken lines in FIG. 8, the basic phase signal also can be regenerated from the regenerated output of the amplifier 112.

The explanation of this embodiment has been made with reference to the case of the two-phase modulation (phase reversing modulation). However, it can be applied also to the regenerative repetition of four-phase phase modulated signals and other polyphase phase modulated signals. For example, in the case of four phases, the regeneration of the basic phase signal will be detected from a fourth-power circuit, or the fourth power nonlinear term of a nonlinear element, its frequency will be four times the intermediate frequency and no alternation of the formation will be required. Further, in this case, the repetition of the output pulses of the pulse generating circuit will be twice as many as in the case of two phases but the fundamental operation will not be different. It is necessary, in this case, that the pulse generating circuit should be able to generate high speed pulses and that the bias value of the monostable multivibrator adjusted so that the phase may be determined for the four phases.

Further, the threshold value characteristic is so favorable that it is desirable to use a monostable multivibrator for the determination of the phase. But, it should be added that an element having a threshold value characteristic, such as the rectification characteristic of a diode can be used.

The third object of the present invention shall now be explained with reference to an embodiment shown in FIGS. 13 to 17.

Figure 13:
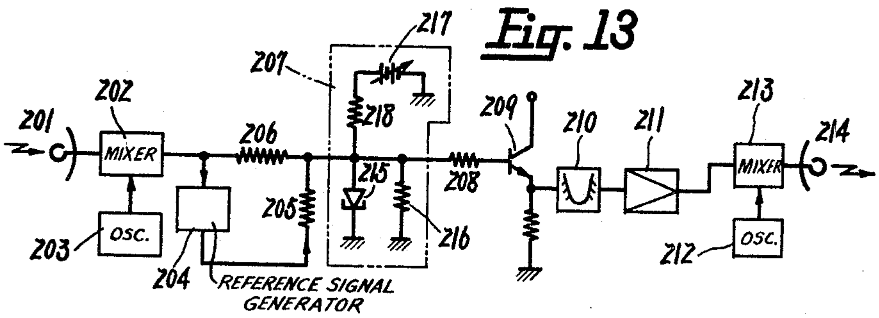
FIG. 13 is a block diagram of a regenerative repeater system in which is used the regenerating circuit of the present invention.

First of all, the entire formation of said regenerative repeater shall be explained with reference to the block diagram in FIG. 13.

A signal received through an antenna 201 is mixed with the output of a local signal source 203 in a mixing circuit 202 and is converted to a signal of an intermediate frequency (which shall be known as a regenerated signal hereinafter).

Figure 14:
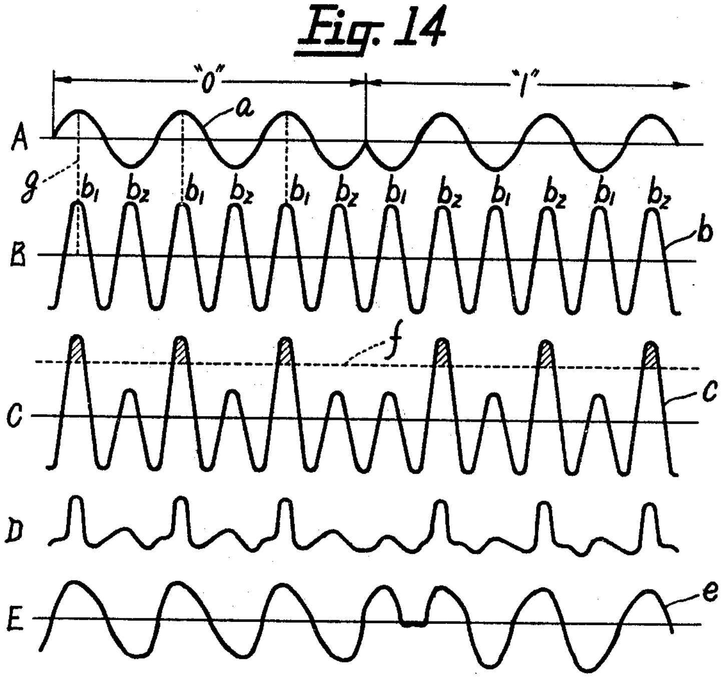
FIG. 14 is a wave form relation diagram, of the respective parts in FIG. 13.

Curve A in FIG. 14 shows the case in which the regenerated signal *a* is two-phase phase-modulated and the code informations 0 and 1 show the regenerated signal in the parts 0 and $\pi$ of the phase. In the case of the two-phase phase-modulation of regenerated signal, there will be generated a continuous basic phase wave signal *b* of a frequency twice as high as the intermediate frequency and not modulated in the phase.

As shown in B in FIG. 14, alternate peak values $b_1$ (or $b_2$) of basic phase wave signal *b* from circuit 204 shows a time position of correct phase 0 (or phase of $\pi$) having no fluctuation of the phase. The basic phase wave signal *b* passed through a coupling resistance 205 is superposed on a regenerated signal *a* passed through a coupling resistance 206 and is added to a phase regenerating circuit 207 so that the phase may be regenerated.

The output of phase regenerating circuit 207 is added to an emitter follower 209 through a coupling resistance 208 and drives a wave filter 210 of a proper band characteristic having the intermediate frequency as a center frequency, the phase-modulated signal is regenerated by wave filter 210, is amplified by an amplifier 211, has the frequency converted with the output of a microwave source 212 in a mixing circuit or a transmitted frequency converting circuit 213 and is transmitted through an antenna 214.

In accordance with the present invention, a phase is generated, in a direct regenerative repeater, using a negative resistance element, such as a tunnel diode, and a resistance thereby simplifying formation of the direct regenerative repeater.

An embodiment of the present invention shall now be explained in detail in the following with reference to the drawings. The phase regenerating circuit 207 for regenerating phases is formed by connecting a resistance 216 in parallel with a tunnel diode 215 so that tunnel diode 215 may be biased through a bias resistance 218, from a bias potential source 217.

Figure 15:
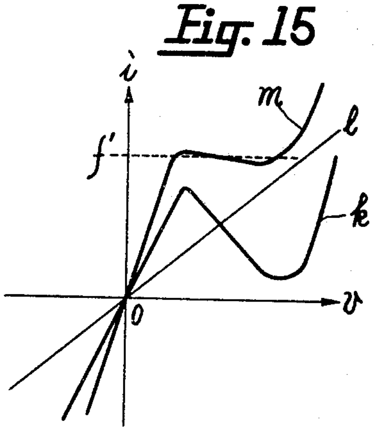
FIG. 15 is a diagram for explaining the characteristics of the regenerating circuit of FIG. 13.

When the resistance value of parallel resistance 216 is so selected as to be substantially equal to the negative resistance value of the tunnel diode 215, as shown in FIG. 15, the voltage V to current *i* characteristic of the phase regenerating circuit 207 will show a threshold value characteristic *m* in which a current level $f'$ obtained by adding the negative resistance characteristic *k* of tunnel diode 215 and the load characteristic *l* of the parallel resistance 216, is made a threshold value.

When a basic wave signal *b* is superposed on a regenerated signal, there is obtained a signal *c* whose amplitude is larger than that of the regenerated signal. If the peak values $b_1$ and $b_2$ coincide with the level *f*, unless the recurring frequency of the code information is substantially different, and if the signal *c* is applied to phase reproducing circuit 207 having such a threshold value characteristic, near the hatched part *c* of FIG. 14, that is, near the peak value time of the signal $b_1$, a large output voltage will appear at both terminals of tunnel diode 215. This wave form, that is, the output wave form of the phase regenerating circuit 207, is shown in D in FIG. 14.

As described above, if the output of phase regenerating circuit 207 is filtered with the proper wave filter 210, a phase-modulated signal *e* (which shall be known as a regenerated signal hereinafter), whose wave form is shown at E in FIG. 14 can be regenerated. FIG. 14 illustrates the case in which the maximum value of the regenerated signal $a$ and the time position of the peak value $b_1$ (or $b_2$) of the basic phase wave signal $b$ coincide with each other, that is, show correctly the phase 0 (or $\pi$). However, as evident from the fact that the phases 0 and $\pi$ of the regenerated signal $e$ are given by the basic wave components of the pulse-shaped wave form of the phase regenerating circuit, as the threshold value $f$ of the superposed signal $c$ is determined in the central position of this part, even if, due to noises or the variation of the propagating line characteristics, the phase of the regenerated signal $a$ has fluctuated and has deviated from the state showing the correct phase 0 or $\pi$ with respect to the basic phase wave signal $b$ (whose phase fluctuation may be considered not always to occur), if the amplitude of the basic phase wave signal $b$ is so selected as to be several times to several tens of times as large as of the regenerated signal $a$, the may-be region in which it cannot be determined whether the phase of the regenerated signal $a$ is 0 or $\pi$, will become very narrow and the phase deviation of the regenerated signal $e$ in the direct regenerative repeater, will be very small. This will be explained with reference to FIGS. 16 and 17.

Figure 16:
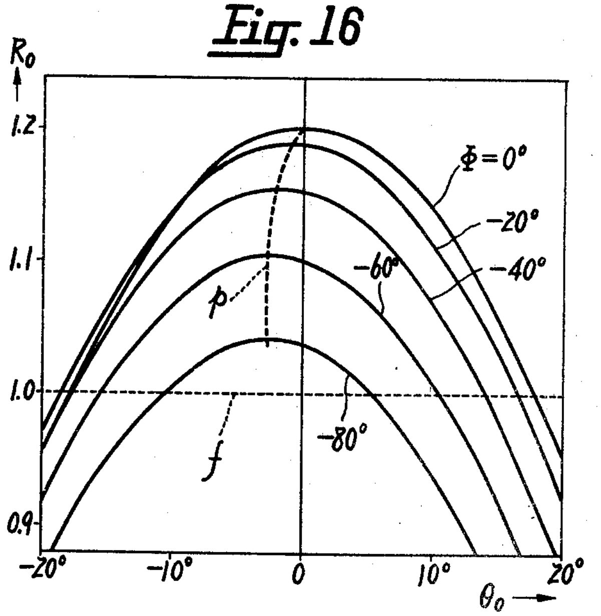

In FIG. 16, the ratio of the amplitudes of the regenerated signal $a$ and the basic phase wave signal $b$ is selected to be 1:5, the phase deviation $\phi$ of the regenerated signal $a$ is made a parameter and how the signal $c$, obtained by superposing the regenerated signal $a$ on the basic phase wave signal $b$, will vary is shown by taking the amplitude $R_0$ of the regenerated signal $a$ made basic with the amplitude of the basic phase wave signal $b$, as the ordinate and taking the time $\theta_0$ as converted to the angle of the regenerated signal $a$ as the abscissa. The dotted line $p$ represents the variations of the central position of the superposed signal $c$ with respect to the respective phase deviations $\phi$. If the tunnel diode bonding capacity is neglected (in fact, due to this, there is some deterioration), the variation of the central position may be considered to be the phase deviation of the regenerated signal $e$. It is found that, when the phase deviation $\phi$ of the regenerated signal $a$ is $\pm 80$ degrees, the variation of the central position will be kept to be within $\pm 3$ degrees.

Figure 17:
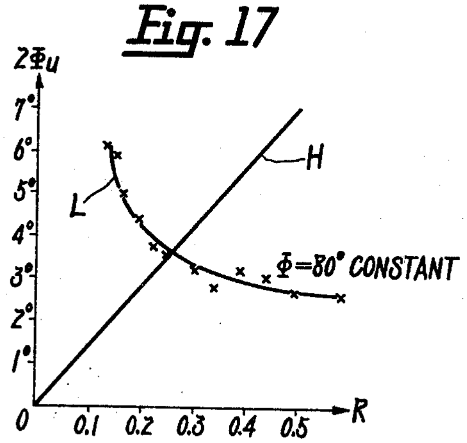
FIGS. 16 and 17 are phase regenerating characteristic diagrams of the regenerating circuit.

FIG. 17 shows a characteristic H, which is the phase deviation of the regenerated signal $e$ in case the phase deviation $\phi$ of the regenerated signal $a$ is 80 degrees, by taking as the abscissa, the ratio R of the amplitude of the regenerated signal $a$ to that of the basic phase wave signal $b$, and also shows a phase regenerating characteristic L by taking as the ordinate, the may-be region 2 $\phi u$, of how far the regenerated signal $a$ will deviate from +90 degrees (or −90 degrees) when the phases 0 and $\pi$ (that is, the codes 0 and 1) cannot be distinguished from each other. It is shown therein that, in the case of a two-phase phase modulation, if amplitude ratio R is selected to be about 0.4 to 0.13, the phase deviation of the regenerated signal $e$ will be 6 degrees and the may-be region will be kept within $\pm 3$ degrees. There is already known a phase regenerating circuit in a direct regenerative repeater wherein a threshold value characteristic of a monostable multivibrator is utilized. (See 877: "Experiments on the Regenerative Repetition of PCM-PM Carrier Pulses" by Owaku and Hata at the Nationwide General Meeting of the Telecommunication Society, 1965.) However, by using only a narrow sampling pulse from the sine wave-shaped signal shown in B in FIG. 14, the same phase regenerating characteristic can be obtained in the present invention. In this respect, the present invention, in which no such operation is required, has the outstanding advantage that the formation is simple and that the regenerative repetition in a higher frequency band and, with the use of a negative resistance element of favorable characteristics, the direct regenerative repetition in a microwave frequency band, are also possible. The negative resistance element, resistance and bias potential source may be connected not only in parallel, as in this embodiment, but also in series, respectively, as voltage sources.

Further, in the present invention, the basic phase wave signal need not be limited to a sine wave-shaped signal but, in case a more precise phase regeneration characteristic is required in a range in which the intermediate frequency is not too high, a pulse-shaped basic phase wave signal should be used.

Further, it should be added that the phase regenerating circuit of the present invention can be used for the regenerative repetition of phase modulated signals of many phases by codes, as well as of two phases by only making the frequency of the basic phase wave signal correspond to the number of phases and making the peak value of the basic phase wave signal and the magnitude of the threshold value have a fixed relationship between them. (In the case of four phases, the ratio of the threshold value to the peak value is usually selected to be $1:\sqrt{2}$.)

What is claimed is:

1. A regenerative repeater, for regenerating signals of phase modulated waves of at least two phases, comprising, in combination, an input terminal for input signals of phase modulated waves; a local signal source; a mixer connected to said input terminal and said local signal source to provide intermediate frequency output signals corresponding to said input signals; generating means connected to the output of said mixer and generating basic phase reference signals, from the intermediate frequency signals, corresponding to the respective modulated phases; amplitude discriminating means connected to said mixer; combining means connected to said generating means and said amplitude discriminating means and combining said intermediate frequency output signals and said basic phase reference signals to phase modulate the intermediate frequency output signals; band pass filter means connected to said combining means to derive the regenerated signals; and an output terminal connected to said band pass filter means.

2. A regenerative repeater, as claimed in claim 1, in which said combining means comprises sampling circuit means connected to the output of said amplitude discriminating means; plural phase shifting circuits connected to said generating means and dividing the output of said generating means into basic phase reference signals differing by an equal number of degrees from each other; and plural sampling pulse generating circuits each connecting a respective phase shifting circuit to said sampling circuit means.

3. A regenerative repeater, as claimed in claim 2, including a slicing circuit connected between said combining means and said band pass filter means and slicing the outputs of said sampling circuit means at a fixed slicing level to provide to said band pass filter means only those outputs attaining said fixed slicing level.

4. A regenerative repeater, as claimed in claim 1, in which said generating means includes means generating basic phase reference signals in the form of pulse trains corresponding to the number of modulated phases; said combining means comprising circuit means providing an output signal only responsive to input signals exceeding a pre-selected threshold value; and means superposing said pulse trains on said intermediate frequency output signals at the input of said circuit means; the output of said circuit means comprising those superposed input pulses thereto exceeding said threshold value, and the output of said circuit means being connected to the input of said band pass filter means.

5. A regenerative repeater, as claimed in claim 4, in which said circuit means comprises at least one monostable multivibrator.

6. A regenerative repeater, as claimed in claim 4, in which said generating means generates basic phase reference signals having an amplitude larger than that of said intermediate frequency output signals, at a frequency corresponding to the number of modulated phases; said circuit means comprising a negative resistance element and a resistance, connected to each other and having substantially equal ohmic values; the threshold value being determined by the sum of said ohmic values.

7. A regenerative repeater, as claimed in claim 6, in which said negative resistance element is a tunnel diode.

References Cited

UNITED STATES PATENTS

| | | | |
|---|---|---|---|
| 3,383,598 | 5/1968 | Sanders | 179—15 |
| 3,404,229 | 10/1968 | Downey | 179—15 X |
| 3,415,952 | 12/1968 | Blackburn | 179—15 |

RALPH D. BLAKESLEE, Primary Examiner

U.S. Cl. X.R.

178—70; 179—15; 325—7